United States Patent [19]

Fischbeck

[11] 4,104,645

[45] Aug. 1, 1978

[54] COINCIDENCE INK JET

[75] Inventor: Kenneth H. Fischbeck, Dallas, Tex.

[73] Assignee: Xerox Corporation, Stamford, Conn.

[21] Appl. No.: 731,407

[22] Filed: Oct. 12, 1976

Related U.S. Application Data

[63] Continuation-in-part of Ser. No. 625,988, Oct. 28, 1975, abandoned.

[51] Int. Cl.$^2$ .............................................. G01D 15/18

[52] U.S. Cl. .................................. 346/140 R; 137/823

[58] Field of Search ............................ 346/140 R, 75; 235/201 PF; 137/823

[56] References Cited

U.S. PATENT DOCUMENTS

| | | | |
|---|---|---|---|
| 1,709,926 | 4/1929 | Weaver | 346/75 X |
| 1,841,452 | 1/1932 | Ranger | 346/75 X |
| 3,152,858 | 10/1964 | Wadey | 346/75 |
| 3,190,554 | 6/1965 | Gehring | 235/201 PF |
| 3,373,436 | 3/1968 | Auphan | 346/75 |
| 3,493,004 | 2/1970 | Hellbaom | 137/823 |
| 3,560,641 | 2/1971 | Taylor | 346/75 X |
| 3,719,952 | 3/1973 | Elbaum | 346/75 |
| 3,747,120 | 7/1973 | Stemme | 346/75 |
| 3,848,118 | 11/1974 | Rittberg | 346/140 X |
| 3,848,258 | 11/1974 | Mahoney | 346/140 |

OTHER PUBLICATIONS

Magill et al., Printer-Recorder, IBM Tech. Disc. Bulletin, vol. 13, No. 9, Feb. 1971, pp. 2703-2704.

*Primary Examiner*—Joseph W. Hartary

[57] ABSTRACT

Several coincidence ink jet array systems are provided wherein each ink jet has two inlet passages communicated to an outlet orifice. An ink droplet is expressed from the orifice only when pressure pulses applied to the inlet passages coincide at the orifice.

In one system, each inlet passage of a jet is communicated to a respective transducer and each transducer is connected to a respective electronic driver. In this system, the number of electronic drivers and transducer chambers are substantially less than the number of ink jets. These transducer chambers are time shared for expressing an ink droplet. Actuation of the two transducer chambers communicated to a particular jet, in such a manner that the pressure pulses generated by the respective transducers coincide at the orifice, will effect expression of a droplet therefrom.

In another system, a master transducer chamber is communicated to one inlet passage of each jet. The other inlet of each jet is communicated to a separate respective droplet expression transducer chamber and each droplet expression transducer chamber is connected to a respective electronic driver. In this system, the master transducer chamber is actuated to create at each orifice a pressure pulse which is below the threshold pressure pulse for expressing an ink droplet therefrom. Actuation of any of the droplet expression transducer chambers to generate a pressure pulse which coincides at a particular orifice with the pressure pulse generated by the master transducer, will bring the resultant pressure pulse at the orifice above threshold to effect expression of the droplet from a particular orifice. The droplet expression transducer chambers are not time shared which permits a higher ink expression frequency than in the previous system. The use of a master transducer chamber permits a reduction in total area occupied by the transducers for each jet, permitting closer packing of transducer chambers with a resulting denser array of jets than if the coincidence jet principle were not employed.

47 Claims, 17 Drawing Figures

FIG. 1
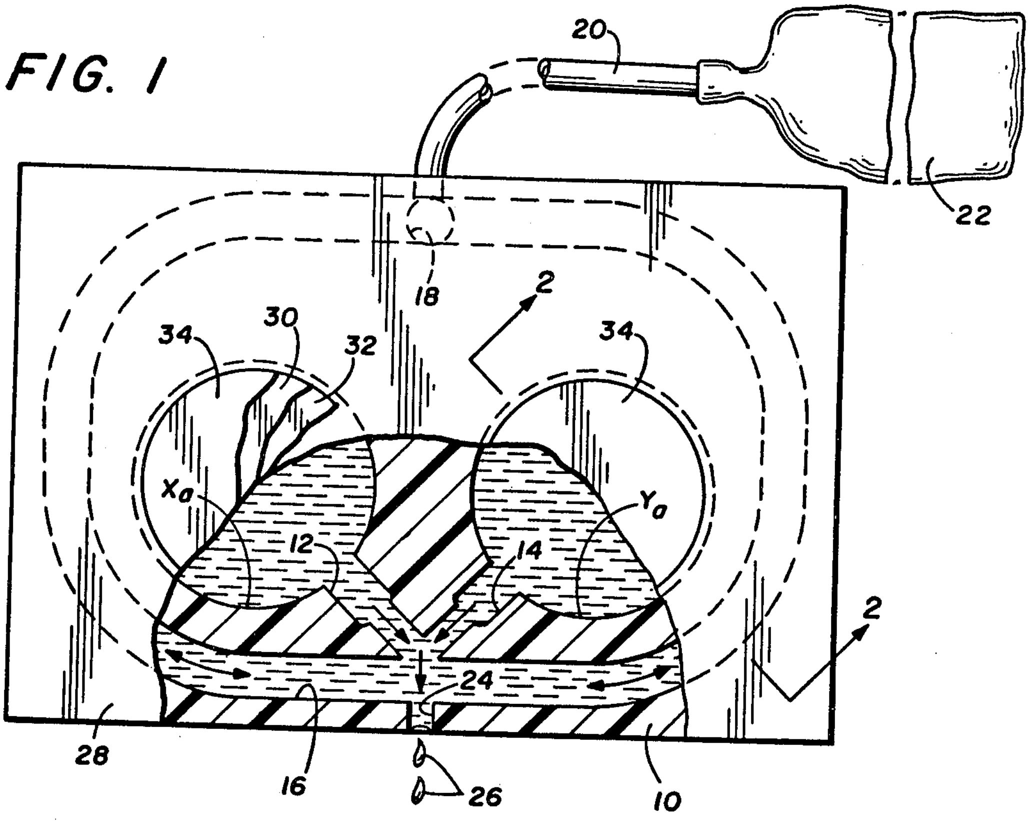
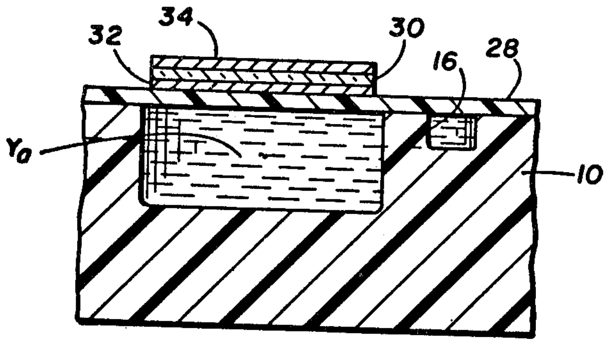
FIG. 2
FIG. 3
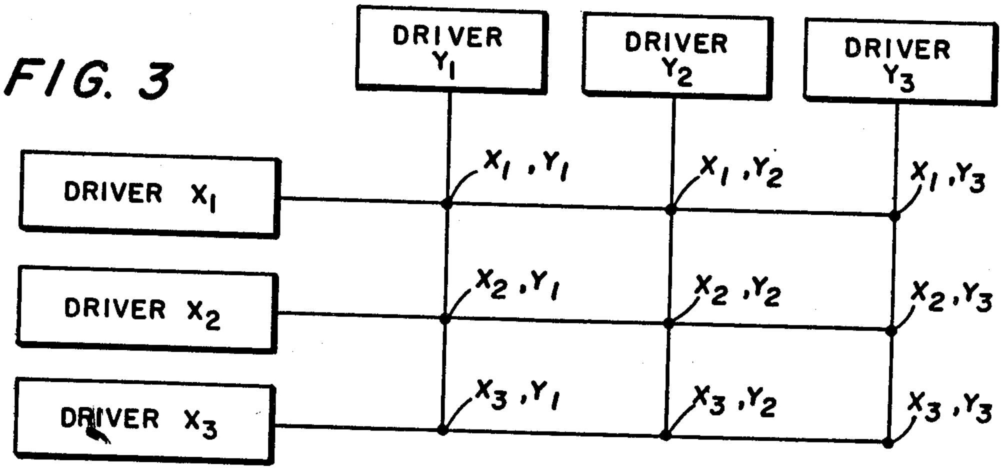

COINCIDENCE INK JET

DESCRIPTION OF THE INVENTION

This application is a continuation-in-part of U.S. application, Ser. No. 625,988, filed Oct. 28, 1975, now abandoned.

This invention relates to a multiple ink jet printing system which expresses droplets of liquid ink through certain ink jet orifices upon a demand which is in accordance with an image to be printed. An ink jet assembly of this type usually employs a separate transducer pressure chamber associated with each ink jet orifice. A displacement device, such as a piezoelectric member, is associated with the chamber and is activated to compress the chamber and thereby express ink from its respective orifice. A separate electronic driver is utilized for each piezoelectric member. This becomes very expensive and complicated when a system utilizing a large number of ink jets is employed. Furthermore, this is not desirable when employing a dense linear array of ink jets.

It is an object of this invention to provide a coincidence gate ink jet construction which serves as the basis for several different ink jet array systems.

It is another object of this invention to provide a multiple ink jet printing system which utilizes significantly fewer electronic drivers and transducers than the number of ink jets employed in the system.

To accomplish the above object, a multiple ink jet system is provided wherein the number of electronic drivers and transducer chambers are substantially less than the number of ink jets. In one embodiment, each ink jet has two ink inlet passages communicated with an outlet orifice. Each inlet passage is communicated to a respective transducer and each transducer is connected to a respective electronic driver. An ink droplet is expressed from the jet only when the pressure pulses generated by the respective transducers coincide at the orifice communicating with a particular two ink inlet passages.

Yet another object of this invention is to provide a multiple ink jet printing system which is capable of expressing droplets at a frequency as great as that of a prior art system which utilizes a single transducer for each jet, but which employs a total smaller transducer area than the prior art system for each jet to permit closer packing of transducers and thereby a denser array of jets than possible in the prior art system.

To accomplish this object, each jet has two ink inlet passages. A master transducer chamber is communicated to one inlet passage of each jet. The other inlet of each jet is communicated to a separate respective droplet expression transducer chamber. The master transducer chamber is actuated to create a pressure pulse at the orifice of each jet below the threshold pressure pulse for expressing an ink droplet therefrom. Coincidental pressure pulses at the orifice from any of the droplet expression transducer chambers and from the master transducer chamber will bring the resultant pressure pulse at the orifice above threshold to effect expression of the droplet from a particular orifice.

Other objects of the invention will become apparent from the following description with reference to the drawings wherein:

FIG. 1 is a cutaway view of an ink jet assembly illustrating the principles of the invention disclosed herein;

FIG. 2 is a view taken along section line 2—2 of FIG. 1;

FIG. 3 is a view of an electronic matrix system;

Figure 5:
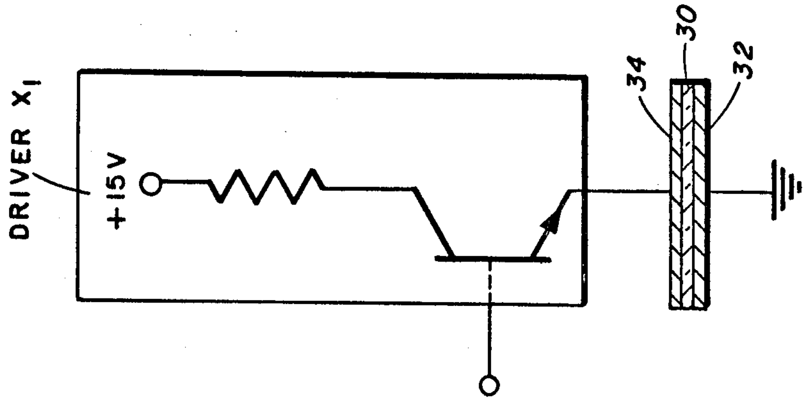
FIG. 5 is a schematic of a typical electronic driver electrically connected to a piezoelectric member.

Referring to FIG. 1, a cutaway view of one member 10 of an ink jet housing assembly is shown illustrating the principles of the invention. A pair of transducer chambers $X_a$ and $Y_a$ is provided in the member 10. Fluid pressure passages 12 and 14 lead from the chambers $X_a$, $Y_a$, repsectively, to a liquid ink supply passage 16 where the three passages intersect. The liquid ink supply passage 16 is communicated to a port 18 which in turn is communicated through a conduit 20 to an ink supply reservoir 22, located remotely from the housing, which comprises a sealed flexible bag. Also, at the intersection is an outlet orifice 24 through which ink droplets 26 are expressed onto a copy medium.

Referring to FIG. 2, the chambers and passages are sealed by a flat flexible layer 28 bonded to the member 10. The transducer chambers $X_a$, $Y_a$ are fluid tight except for passages 12 and 14 communicating therewith. The transducer chambers and passages 12, 14 and 16 are completely filled with liquid ink. A piezoelectric ceramic member 30 is sandwiched between and bonded to a pair of electrodes 32 and 34 with the electrode 32 being bonded to the layer 28 thereby effectively bonding the piezoelectric member 30 thereto. The piezoelectric member 30 is polarized during the manufacture thereof to contract in a plane parallel to the plane of the flexible layer 28 when excited by applying a voltage potential across the conductive members 32 and 34. Contraction of the piezoelectric member 30 will cause the flexible layer 28 to buckle inwardly thereby decreasing the volume in its respective chamber and effecting pressure on the liquid ink therein. The members 10 and 28 of the housing may be glass or plastic.

When the piezoelectric member for either transducers $X_a$ or $Y_a$ is activated, a fluid pressure pulse will occur in a respective one of passages 12 and 14 causing displacement of ink along the respective passage. The passages 12 and 14 are at such an angle relative to the orifice 24, the impedance to liquid flow in passage 16 relative to the impedance to liquid flow in orifice 24, and the magnitude and duration of a pressure pulse exerted by the transducer chambers $X_a$, $Y_a$ are designed that the ink stream expressed from only one passage at a time will entirely miss orifice 24 and displace the ink in the ink supply passage 16 while the ink within orifice 24 will not be disturbed to the extent of expressing a droplet therethrough. The orifice 24 is so located relative to the intersection of the passages 12, 14 and the magnitude and duration of the pressure pulse exerted by the transducer chambers $X_a$, $Y_a$ are so designed that the resummation vector of the fluid momentum vectors in passages 12 and 14 will lie on the axis of the orifice 24. Thus, only when the piezoelectric members for both transducer chambers $X_a$, $Y_a$ are activated in a manner that pressure pulses generated by the respective transducers coincide from the intersection of passges 12, 14, to the orifice 24 will an ink droplet 26 be expressed from orifice 24. It should be understood that the peaks of the pressure pulses generated by both transducers do not necessarily coincide between the intersection of passages 12 and 14 and the orifice 24, but there must be at least an overlap of the pressure pulses thereat. In this case illustration, the orifice is hydraulically equal distance from each transducer chamber, the piezoelectric members for both transducers will be simultaneously or conicidently activated.

Since the transducer chambers are fluid tight except for the passages 12 and 14 communicating therewith, at the termination of a pressure pulse, ink is drawn into the passage 12 or 14 from which ink was expressed. If a pulse is applied to only one of the passages 12, 14, then most of the ink expressed therefrom will be drawn back into the passage with the remainder of the ink drawn into the passage being supplied from supply passage 16. If a pulse was applied to both passages 12, 14 simultaneously resulting in an ink droplet being expressed from orifice 24, then ink from supply passage 16 will be drawn into both passages 12, 14 after pulse termination. Thus, the ink within the pressure chambers $X_a$, $Y_a$ and most of passages 12, 14 is stagnant or confined therein and acts only as a mechanical ram for expressing ink droplets through the orifice 24 with the ink forming the droplets being supplied form the reservoir 22.

The aforedescribed principle has specific utilization in a jet array system where a large number of jets are utilized or in a dense linear jet array. This will become apparent from the following discussion. It is well known in the electrical engineering art that if two independent stimulators are required to effect stimulation of a device and if time sequencing is permitted, then the number of stimulators required is only twice the square root of the number of stimulated devices. For example, only 120 stimulators are needed for 3600 stimulated devices and only 128 stimulators are required for 4096 stimulated devices. This principle is grasped if the stimulated devices are visulized in a matrix array as illustrated in FIG. 3. A plurality of electrical stimulators or input drivers $X_1$, $X_2$ and $X_3$ are arranged along an "X" coordinate while a plurality of electrical stimulators of drivers $Y_1$, $Y_2$ and $Y_3$ are arranged along the other or "Y" coordinate. The six stimulators or drivers are electrically connected at nine intersections with the intersections representing stimulated devices $X_1$, $Y_1$; $X_1$, $Y_2$; $X_1$, $Y_3$; $X_2$, $Y_1$; $X_2$, $Y_2$; $X_2$, $Y_3$; $X_3$, $Y_1$; $X_3$, $Y_2$ and $X_3$, $Y_3$. Activation of any one stimulator by itself will not activate any of the stimulated devices. However, activation of any two stimulators on different coordinates will activate a stimulated device. For instance, stimulated device $X_1$, $Y_2$ will be activated when stimulators or drivers $X_1$ and $Y_2$ are actuated.

Figure 4:
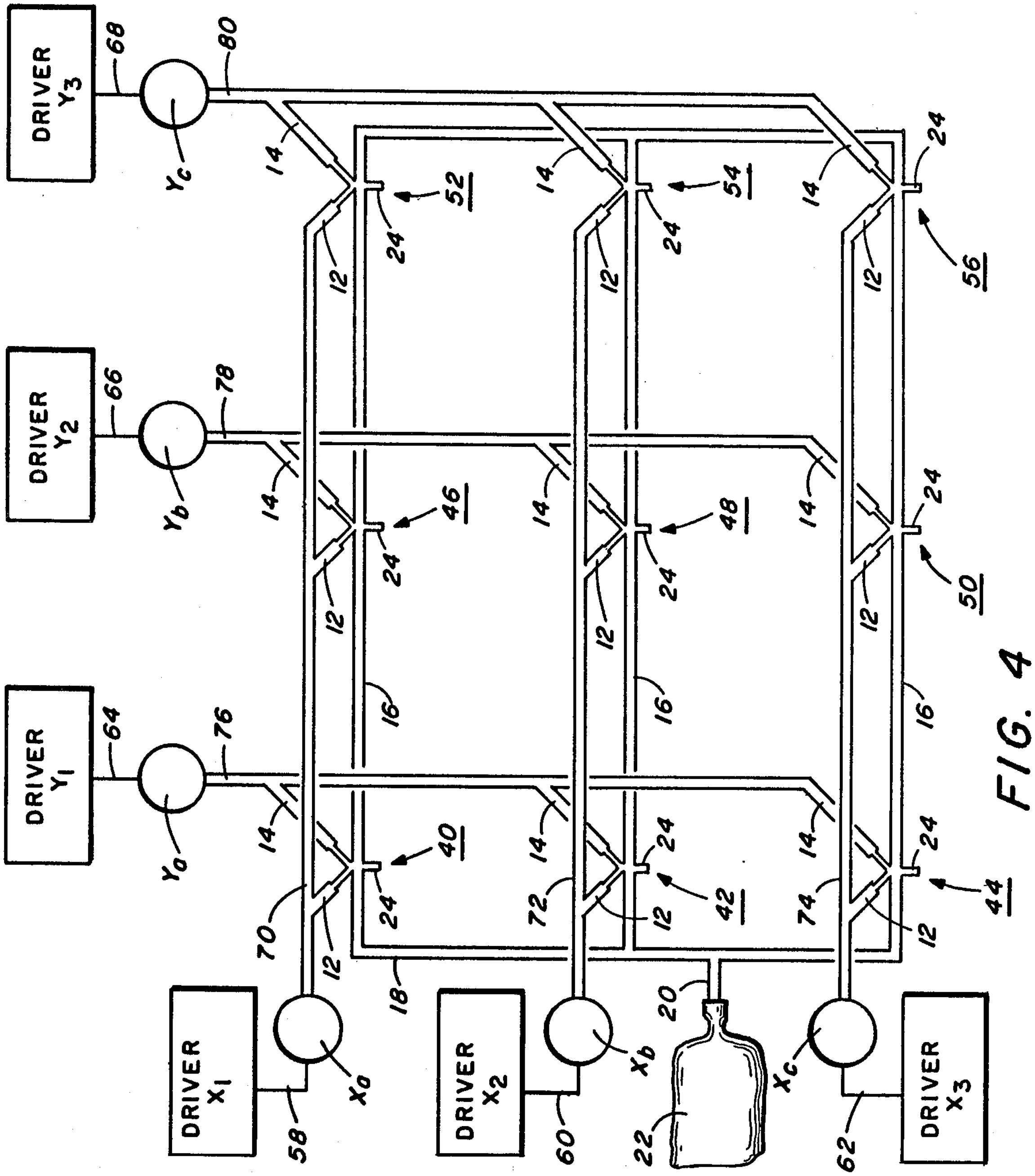
FIG. 4 is a schematic fluid circuit illustrating the principles of the invention.

Referring now to FIG. 4, a schematic fluid circuit is illustrated applying the above described concepts to an array of nine ink jets 40, 42, 44, 46, 48, 50, 52, 54 and 56 each of which has two pressure passages 12, 14, and ink supply passage 16 and an outlet orifice 24. Six electrical input drivers $X_1$, $X_2$, $X_3$, $Y_1$, $Y_2$ and $Y_3$ are electrically connected to a piezoelectric member 30 of transducer chambers $X_a$, $X_b$, $X_c$, $Y_a$, $Y_b$, $Y_c$, respectively, by a respective one of electrical lines 58, 60, 62, 64, 66 and 68.

Referring to FIG. 5, there is illustrated a piezoelectric member 30 electrically connected to a typical electronic driver which is an NPN type transistor in an emitter follower configuration driven between a non-conductive state and a state of saturated conduction in response to positive going pulse-like input signals supplied to the base of the transistor. All of the electronic drivers are electrically connected to their respective piezoelectric members in the same manner.

Referring back to FIG. 4, a conduit 70 communicates transducer chamber $X_a$ with pressure inlets 12 of jets 40, 46 and 52; conduit 72 communicates transducer chamber $X_b$ with pressure inlets 12 of jets 42, 48 and 54; conduit 74 communicates transducer chamber $X_c$ with pressure inlets 12 of jets 44, 50 and 56; conduit 76 communicates transducer chamber $Y_a$ with pressure inlets 14 of jets 40, 42, and 44; conduit 78 communicates transducer chamber $Y_b$ with pressure inlets 14 of jets 46, 48 and 50 and conduit 80 communicates transducer chamber $Y_c$ with pressure inlets 14 of jets 52, 54 and 56. The transducer chambers, conduits and pressure inlets as well as pulse duration and magnitude are all designed that the hydraulic properties at each ink jet are the same. Since an orifice may be hydraulically unequal distances away from the two transducers to which it is communicated, the transducers, in actual practice, will be activated out of phase with each other so that pressure pulse generated by each transducer will occur coincidently from the intersection of the pressure inlets 12, 14 to the orifice 24. The following table shows which jets express droplets therefrom when particular drivers are energized:

| Electronic Drivers Cooperatively Energized | Droplet Expressed From Jet |
|---|---|
| $X_1$, $Y_1$ | 40 |
| $X_1$, $Y_2$ | 46 |
| $X_1$, $Y_3$ | 52 |
| $X_2$, $Y_1$ | 42 |
| $X_2$, $Y_2$ | 48 |
| $X_2$, $Y_3$ | 54 |
| $X_3$, $Y_1$ | 44 |
| $X_3$, $Y_2$ | 50 |
| $X_3$, $Y_3$ | 56 |

Figure 6:
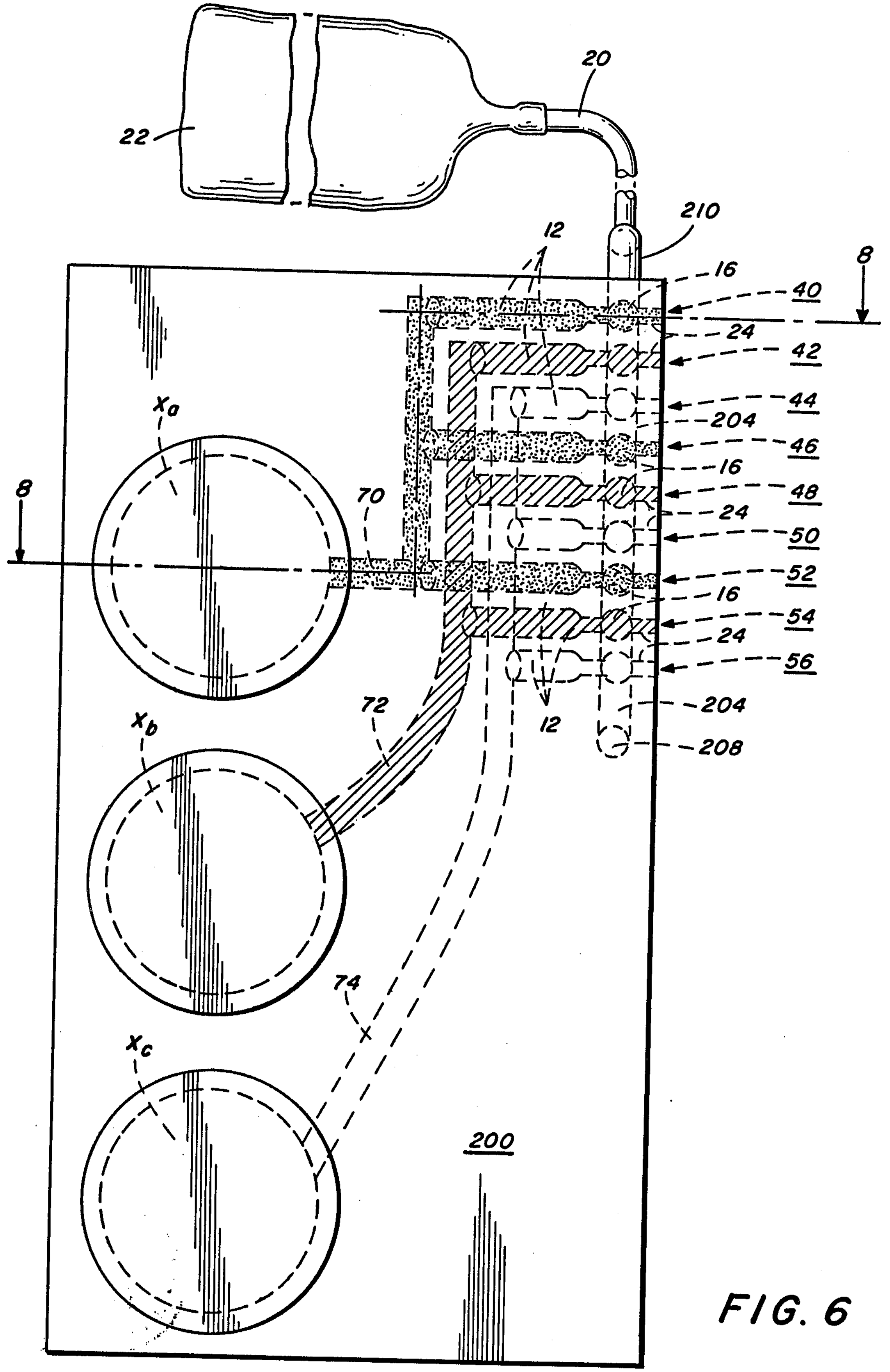
FIG. 6 is a top view of a linear array ink jet assembly.
Figure 7:
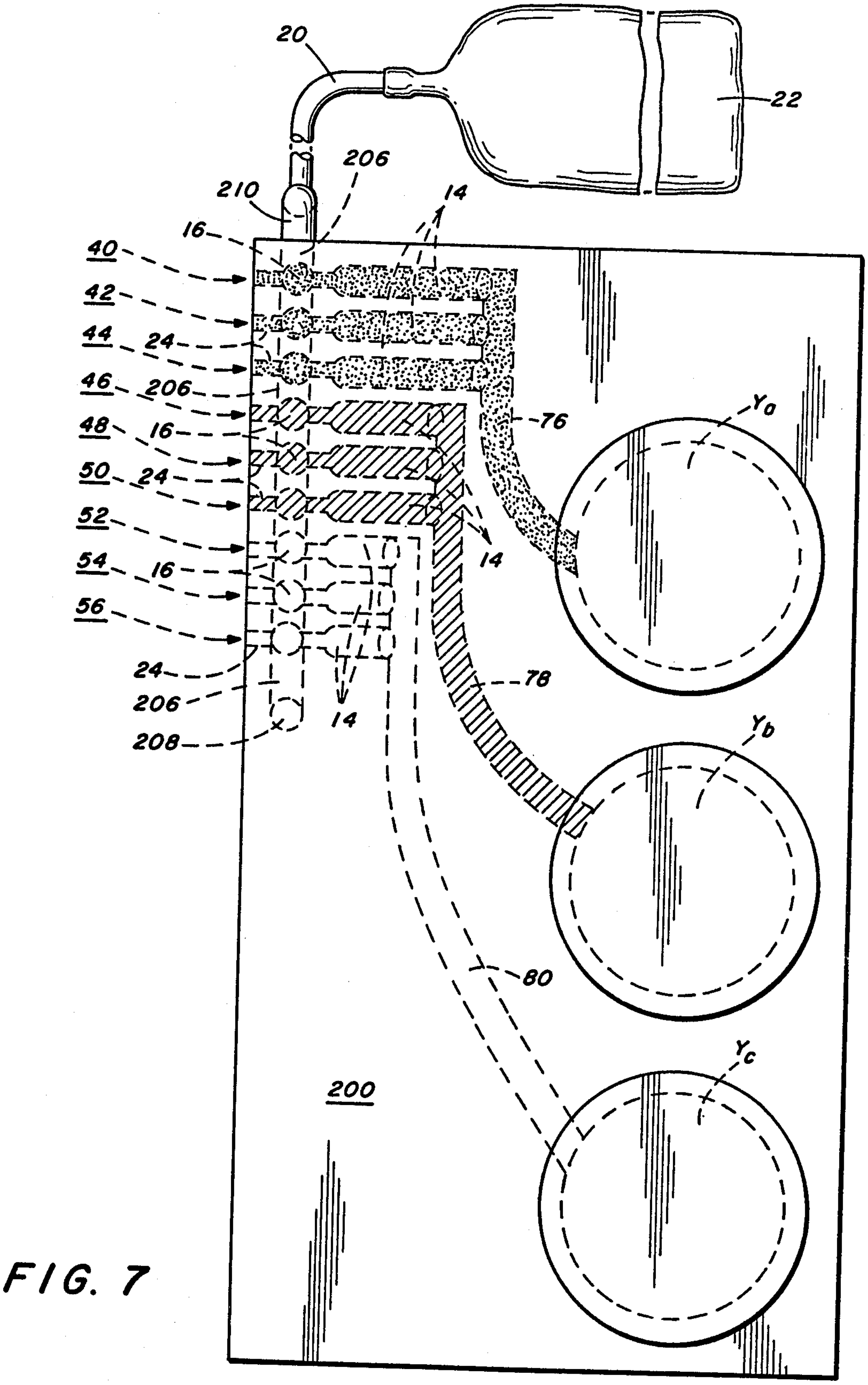
FIG. 7 is a bottom view of the assembly of FIG. 6.
Figure 8:
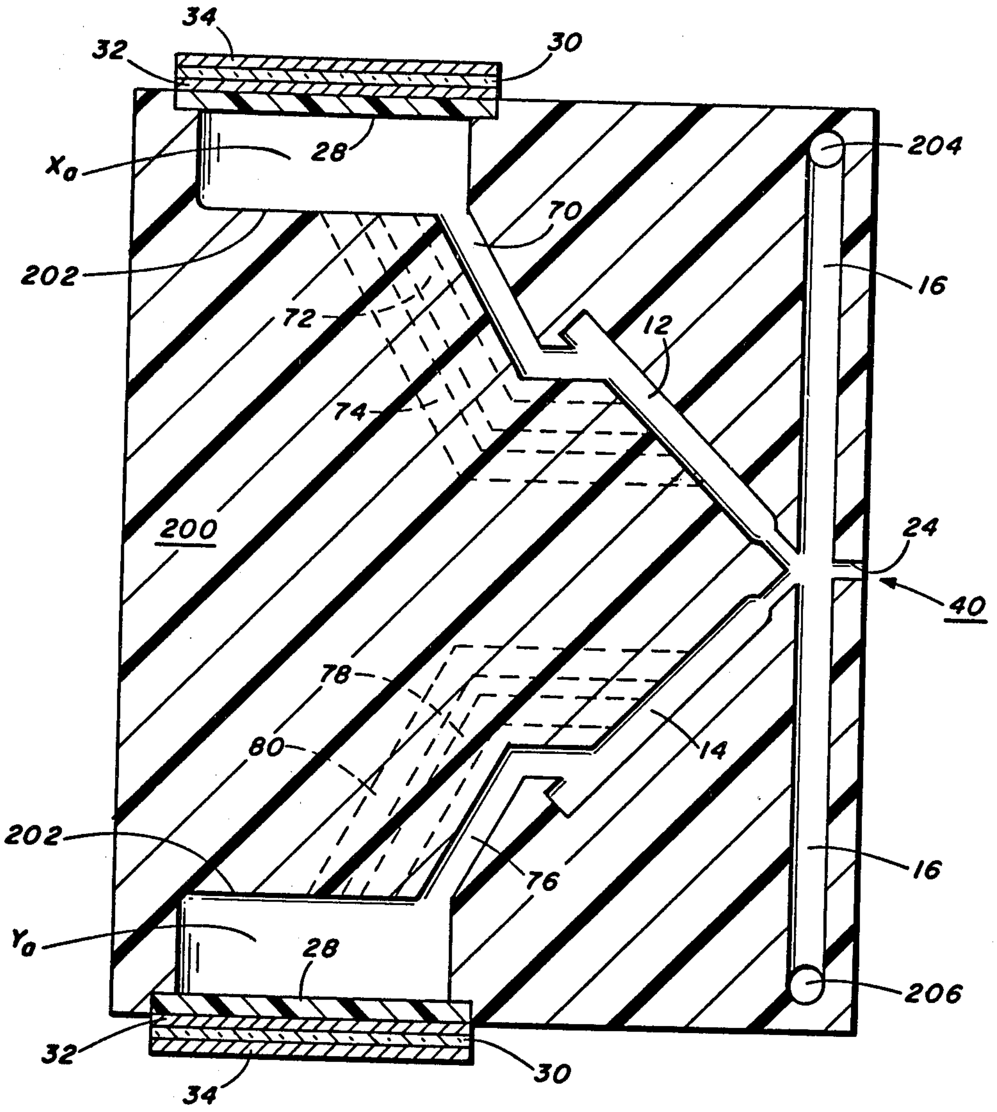
FIG. 8 is a view taken along section line 7—7 of FIG. 6.

Referring to FIGS. 6–8, a nine-jet ink jet assembly in accordance with the schematic of FIGS. 4 and 5 is illustrated with the same elements of FIGS. 1,2,4 and 5 being designated by the same reference numerals. For clarity, FIG. 6 illustrates the fluid passages for only the transducers $X_a$, $Y_b$, and $X_c$; and FIG. 7 illustrates the fluid passages for only the transducers $Y_a$, $Y_b$ and $Y_c$. Also, some of the passages are cross-hatched and filled with dots for clarity in showing separate passages. A housing 200 contains the transducers and fluid passages therein. The fluid passages may be made by drilling and plugging holes where necessary and the transducer chambers may be milled in the housing. Referring to FIG. 8, each main passage 70, 72, 74, 76, 78 and 80 and its respective branch lines leading from the transducers to the inlet passages cross the other main passages and their respective branch lines at different levels since they are not to communicate with each other. All of the branch lines are located at a level between the wall 202 of opposite transducer chambers $X_a$ and $Y_a$ to permit drilling the branch passages without intersecting the chambers $X_a$ and $Y_a$. The ink supply passage 16 for each jet branches off from two parallel main supply passages 204, 206. The passage 204 traverses across the jets at the upper portion of housing 200 and passage 206 traverses across the jets at the lower portion of housing 200. The main supply passages 204, 206 are joined at one end inside the housing by a cross-passage 208 and at the other end by an external C-shaped tubular fitting 210. A flexible bag ink reservoir 22 is communicated to the tubular fitting 210 by a conduit 20.

Figure 9:
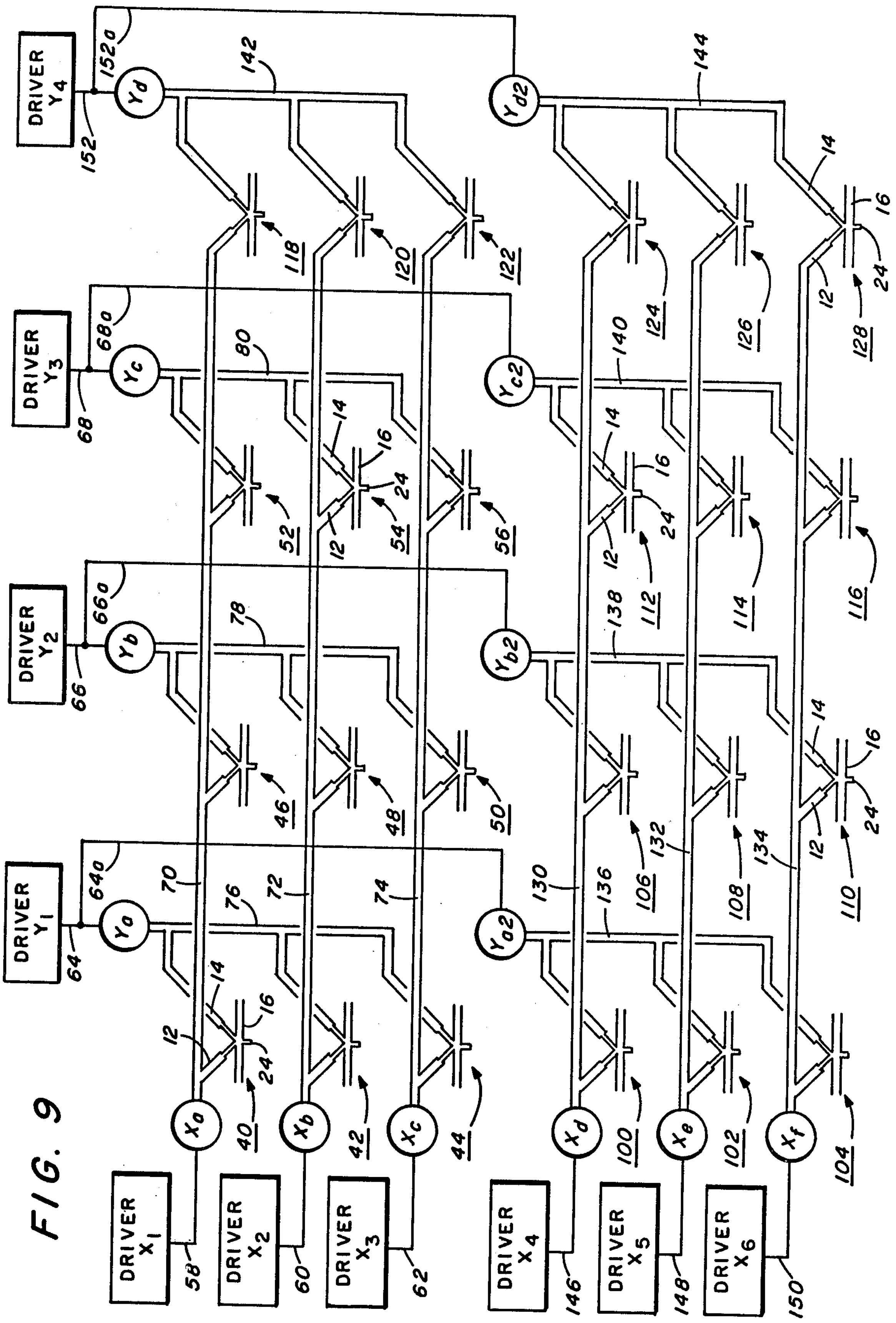
FIG. 9 is a modified schematic of the fluid circuit of FIG. 4.

In the particular example of FIGS. 4–8, there are the same number of transducer chambers as electronic drivers in the system. However, as the number of jets increases in a system, the number of jets communicated to one transducer chamber will be hydraulically limited and, therefore, more than one transducer may be required to be communicated to an electronic driver for simultaneously generating pressure pulses to a plurality of jets. This is illustrated in FIG. 9 where an additional array of fifteen jets 100, 102, 104, 106, 108, 110, 112, 114, 116, 118, 120, 122, 124, 126, 128 have been added to the nine-jet array of FIG. 4. Four more electronic input drivers $X_4$, $X_5$, $X_6$ and $Y_4$ have been added as well as eight more transducer pressure chambers $X_d$, $X_e$, $X_f$, $Y_d$, $Y_{a2}$, $Y_{b2}$, $Y_{c2}$ and $Y_{d2}$. Conduit 130 communicates transducer chamber $X_d$ with pressure inlets 12 of jets 100, 106, 112 and 124; conduit 132 communicates transducer chamber $X_e$ with pressure inlets 12 of jets 102, 108, 114 and 126; conduit 134 communicates transducer chamber $X_f$ with pressure inlets 12 of jets 104, 110, 116 and 128. Conduit 70 also communicates transducer chamber $X_a$ with pressure inlet 12 of jet 118. Conduit 72 also communicates transducer chamber $X_b$ with pressure inlet 12 of jet 120; and conduit 74 also communicates transducer chamber $X_c$ with pressure inlet 12 of 122. Conduit 136 communicates the chamber $Y_{a2}$ with the pressure inlet passages 14 of jets 100, 102 and 104. Conduit 138 communicates transducer chamber $Y_{b2}$ with the pressure inlets 14 of jets 106, 108 and 110. Conduit 140 communicates chamber $Y_{c2}$ with the pressure inlets 14 of jets 112, 114 and 116. Conduit 142 communicates chamber $Y_d$ with pressure inlets 14 of jets 118, 120 and 122; and conduit 144 communicates chamber $Y_{d2}$ with pressure inlets 14 of jets 124, 126 and 128.

The piezoelectric members 30 of chambers $X_d$, $X_e$ and $X_f$ are connected to electronic drivers $X_4$, $X_5$ and $X_6$ by electrical lines 146, 148 and 150, respectively. The piezoelectric members 30 of transducer chambers $Y_a$ and $Y_{a2}$ are connected in parallel to driver $Y_1$ by electrical lines 64 and 64a. The piezoelectric members 30 of transducer chambers $Y_b$ and $Y_{b2}$ are connected in parallel to driver $Y_2$ by electrical lines 66 and 66a. The piezoelectric members 30 of transducer chambers $Y_c$ and $Y_{c2}$ are connected in parallel to driver $Y_3$ by electrical lines 68 and 68a. The piezoelectric members 30 of transducer chambers $Y_d$ and $Y_{d2}$ are connected in parallel to driver $Y_4$ by electrical lines 152 and 152a.

Detailed reference numerals are applied only to several of the jets for clarity, but it should be understood that each jet is identical. Also, for clarity, the ink supply container 22 and the interconnection between the ink jets of the supply passage 16 is not shown but is the same as shown in FIG. 4.

The transducer chambers, conduits and pressure inlets as well as pulse duration and magnitude are all designed that the hydraulic properties at each ink jet are the same. The following table shows which jets express droplets therefrom when particular drivers are energized:

| Electronic Drivers Cooperatively Energized | Droplet Expressed From Jet |
|---|---|
| $X_1$, $Y_1$ | 40 |
| $X_1$, $Y_2$ | 46 |
| $X_1$, $Y_3$ | 52 |
| $X_1$, $Y_4$ | 118 |
| $X_2$, $Y_1$ | 42 |
| $X_2$, $Y_2$ | 48 |
| $X_2$, $Y_3$ | 54 |
| $X_2$, $Y_4$ | 120 |
| $X_3$, $Y_1$ | 44 |
| $X_3$, $Y_2$ | 50 |
| $X_3$, $Y_3$ | 56 |
| $X_3$, $Y_4$ | 122 |
| $X_4$, $Y_1$ | 100 |
| $X_4$, $Y_2$ | 106 |
| $X_4$, $Y_3$ | 112 |
| $X_4$, $Y_4$ | 124 |
| $X_5$, $Y_1$ | 102 |
| $X_5$, $Y_2$ | 108 |
| $X_5$, $Y_3$ | 114 |
| $X_5$, $Y_4$ | 126 |
| $X_6$, $Y_1$ | 104 |
| $X_6$, $Y_2$ | 110 |
| $X_6$, $Y_3$ | 116 |
| $X_6$, $Y_4$ | 128 |

Figure 10:
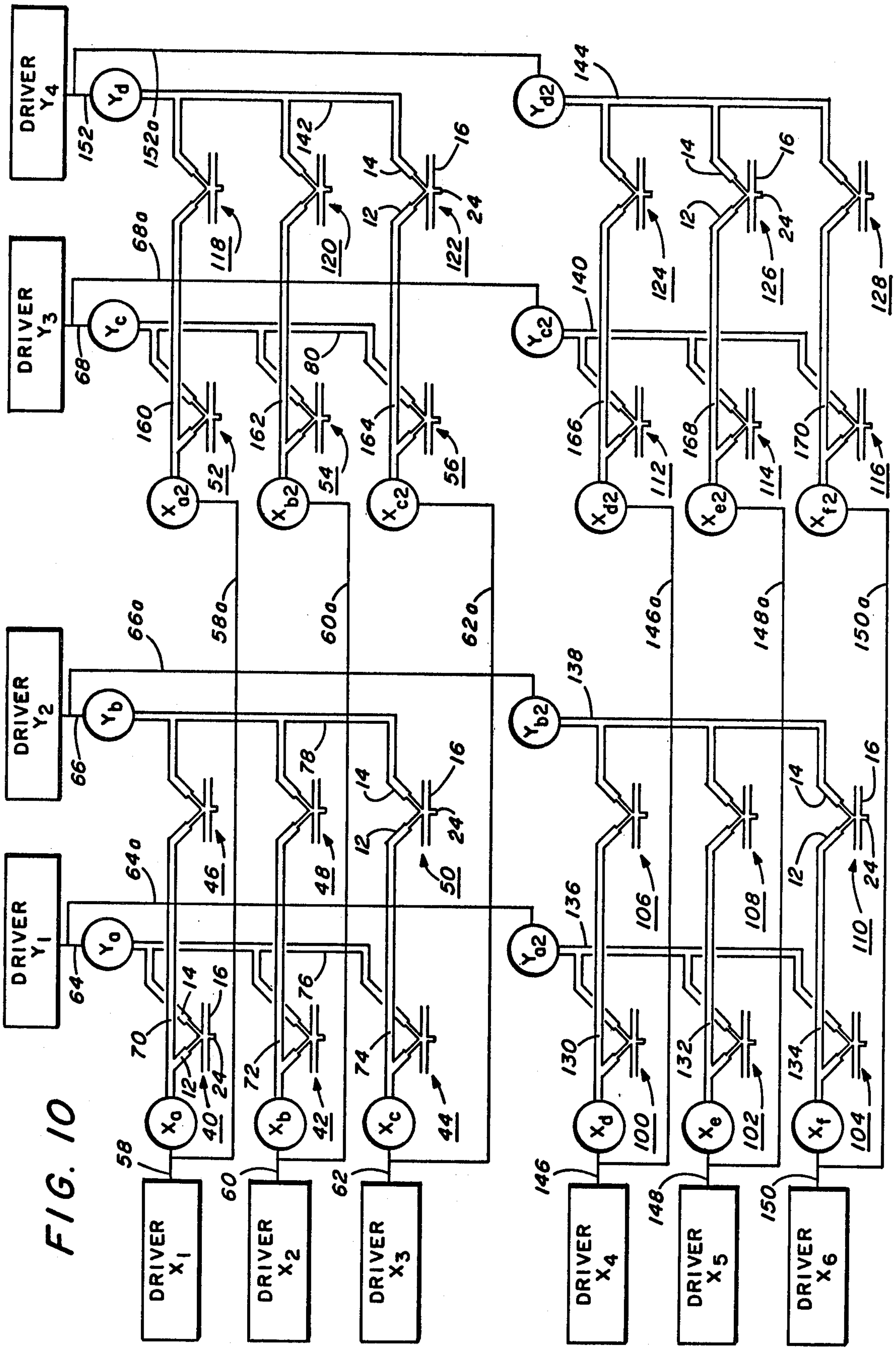
FIG. 10 is a modified schematic of the fluid circuit of FIG. 9.

The schematic of FIG. 9 shows multiple transducer chambers activated by single electronic drivers along the "Y" coordinate. Referring to FIG. 10, multiple transducer chambers activated by single electronic drivers along the "X" coordinate have been added to the schematic of FIG. 9. Transducer chambers $X_{a2}$, $X_{b2}$, $X_{c2}$, $X_{d2}$, $X_{e2}$ and $X_{f2}$ have been added to the schematic of FIG. 9 and the piezoelectric members 30 of each are electrically connected to a respective one of electronic input drivers $X_1$, $X_2$, $X_3$, $X_4$, $X_5$ and $X_6$ by electrical lines 58a, 60a, 62a, 146a, 148a and 150a, respectively. Conduit 160 connects transducer chamber $X_{a2}$ to jets 52 and 118; conduit 162 connects transducer chamber $X_{b2}$ to jets 54 and 120; conduit 164 connects transducer chamber $X_{c2}$ to jets 56 and 122; conduit 166 connects transducer chamber $X_{d2}$ to jets 112 and 124; conduit 168 connects transducer chamber $X_{e2}$ to jets 114 and 126; and conduit 170 connects transducer chamber $X_{f2}$ to jets 116 and 128. The same jets express droplets upon energization of the same electronic drivers are set forth in the previous table for FIG. 9.

In the previous two examples, 14 and 20 transducer chambers were used for 24 jets. This was only to illustrate how additional chambers can be used in the system. The proportional number of transducer chambers will be substantially fewer in a system, which employes a significant amount of jets for high-speed printing. For instance, a system, which may employ approximately 200 jet per inch or a total of about 1600 jets per 8-inch line, may employ about 80 electronic drivers and between about 120 and 400 transducer chambers; and a system, which may employ approximately 450 jets per inch or a total of about 3600 jets per 8-inch line, may employ about 120 electronic drivers and between about 180 and 800 transducer chambers.

From the foregoing described systems, one can readily see the cost savings in the number of electronic drivers and transducers used. In addition to the cost savings, an important advantage to using substantially fewer transducers than the number of jets is the jets may be arranged in a more dense array than in a system where there are the same number of transducers as jets. When the same number of transducers are employed as jets, the transducer spacing is hydraulically limited by the passage length between the transducer and its respective jet thereby limiting the spacing of the jets in accordance with the practical space available for the transducers. Also, an added advantage of fewer transducers is that the transducers may be larger. This permits the assembly to be practically manufactured from the standpoint of constructing the chamber and handling the membrane layer 28 to which the piezoelectric member is bonded. A very thin membrane layer is required for a very small transducer in order to achieve a given deflection for a required pressure pulse thus allowing the use of thicker membranes 28.

The ink jet assembly of FIG. 1 is designed to include a fluid rectifier passage 16, which is communicated to the supply reservoir 22 and provides a fluid wall between the outlet orifice 24 and the intersection of passages 12 and 14 to assure continuity of fluid in the passages thereby preventing air pockets from forming. However, ink jets are available that do not employ such a rectifier and the principles of this invention may be applied to these ink jets also. Two such ink jet assemblies are illustrated in FIGS. 11 and 12 and may also be employed in the systems described in FIGS. 4, 9 and 10.

Figure 11:
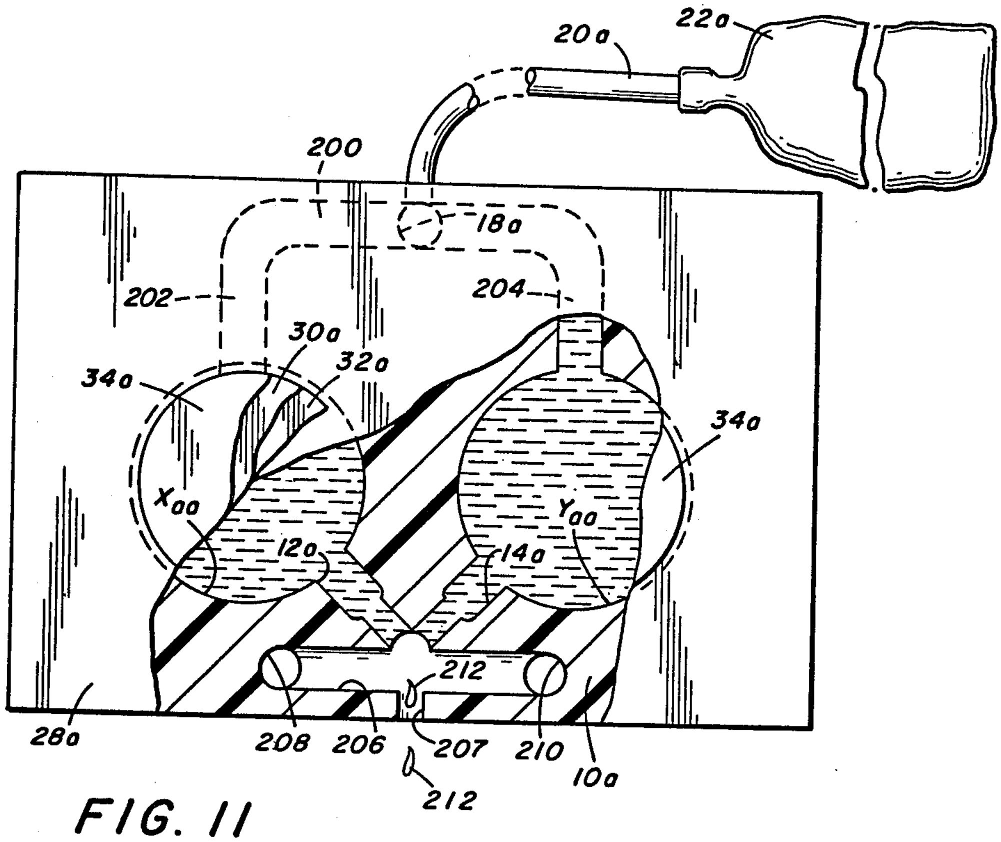
FIG. 11 shows a modification of the ink jet assembly disclosed in FIG. 1 employing the principles of the invention.

Referring to FIG. 11, those elements, which are the same as the embodiment of FIG. 1, are designated by the same reference numeral, only with an "*a*" affixed thereto. The transducer chambers $X_a$a and $Y_a$a are communicated at the rear ends thereof to a fluid supply conduit 200 by a respective one of branch conduits 202 and 204. A drain conduit 206 is located between the intersection of the outlet passages 12a and 14a and an opening 207 and is communicated to ports 208 and 210, each of which communicates the drain conduit 206 to a catch tray (not shown). Normally, the liquid ink meniscus forms in both outlet passages 12a and 14a. In this particular instance, the opening 207 does not act as an orifice but only as an oversized hole in a catch shield to allow droplets to pass through the shield. Independent activation of pressure chamber $X_a$a causes a jet of ink to be expressed from the outlet 12a, which entirely misses the opening 207 and then flows along drain passage 206 to port 210 to the catch tray. Similarly, independent activation of pressure chamber $Y_a$a causes a jet of ink to be expressed from the outlet **14*a*, which entirely misses the opening 207 and then flows along drain passage 206 to port 208 to the catch tray. Simultaneous or coincident activation of transducer chambers $X_a$a and $Y_a$a will result in the jets expressed coincidently from outlet passages 12*a* and 14*a* and joining together with the summation of the liquid momentum vectors acting thereon to direct the same through the opening 207 as a droplet 212**.

Figure 12:
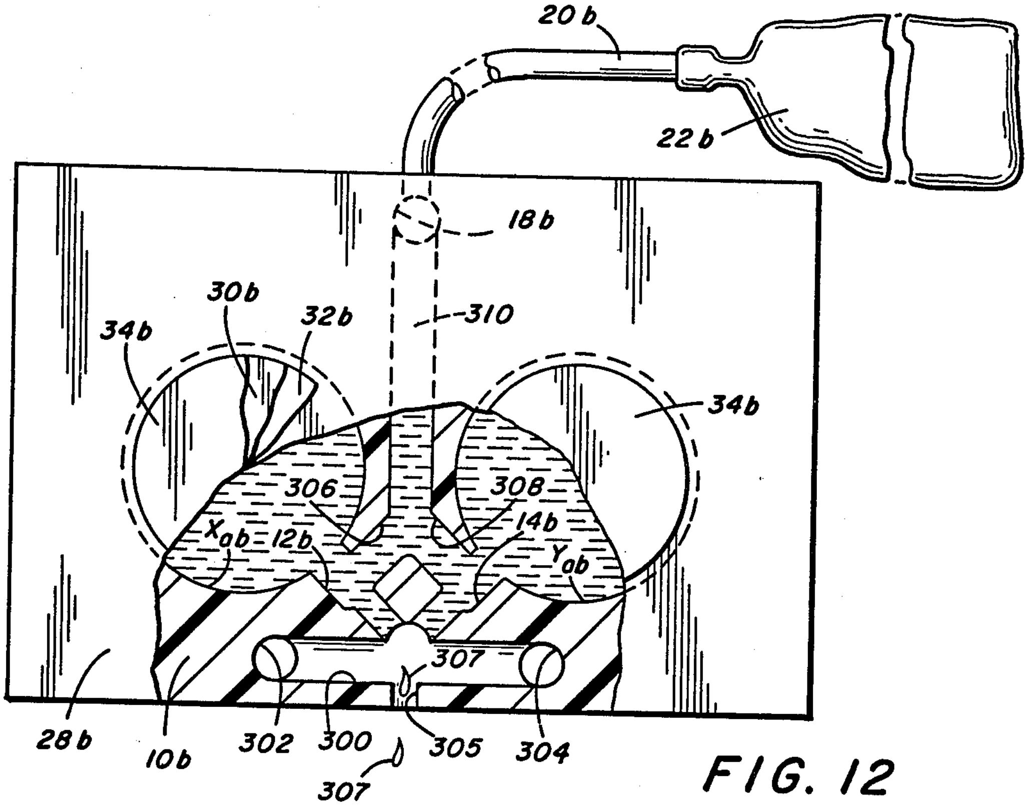
FIG. 12 shows another modification of the ink jet assembly disclosed in FIg. 1 employing the principles of the invention.

Referring now to FIG. 12, those elements, which are the same as in the embodiment of FIG. 1, are designated by the same reference numeral, only with a "*b*" affixed thereto. This embodiment is similar to the embodiment of FIG. 11 with the intersection of outlet passages **12*b* and 14*b*, a drain passage 300, catch tray ports 302 and 304 and outlet orifice opening 305 having the same purpose and relationship to one another to express a droplet 307 through the opening 305 only when both chambers $X_a$b and $Y_a$b are simultaneously or coincidently pressurized. In this modification, the outlet passages 12*b* and 14*b* are connected through a respective branch conduit 306, 308 to a supply conduit 310 which, in turn, is communicated through port 18*b* and conduit 20*b* to the ink supply reservoir 22*b***.

The above embodiments have been described with the jets from the passages 12, 14, **12*a*, 14*a*, 12*b*, 14*b* entirely missing the orifice 24 or openings 207 and 305 when the transducer chambers are independently pressurized. It should be realized that the magnitude of the pressure pulse applied to the transducer chambers may be such that a jet expressed from either passage 12, 14 can be either partially or entirely directed toward the opening without enough momentum to result in a droplet being expressed therefrom. The pressure pulse would be designed that the momentum of the combined jets from such passages would be sufficient to result in a droplet being expressed through orifice 24 or openings 207 and 305**.

Figure 13:
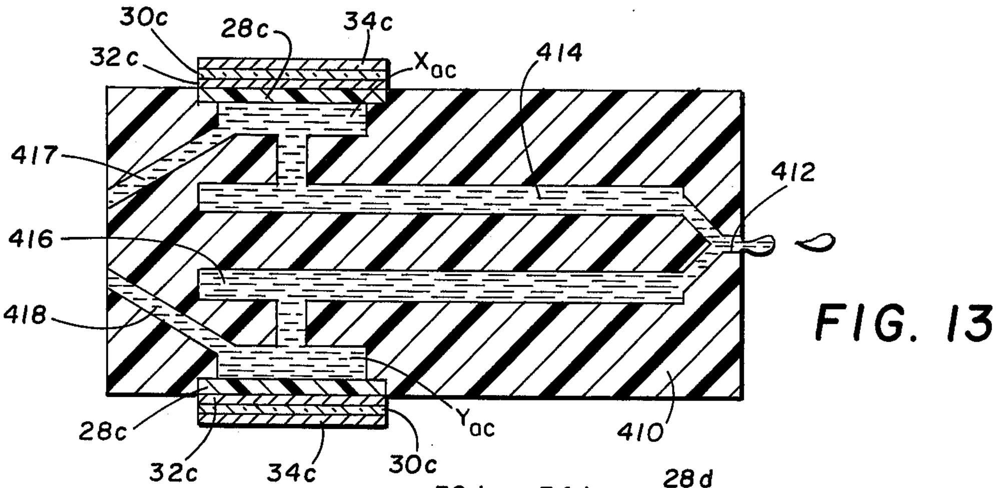
FIG. 13 is a cross section of an ink jet assembly illustrating the principles of this invention in a modified form of the embodiment of FIG. 1.

The coincidence ink jet principle can also be utilized in a manner other than vector summation. A droplet may be expressed from an orifice by the resultant fluid displacement and fluid velocity when the pressure pulse generated by respective transducers coincide at the orifice. This principle is illustrated in FIG. 13. Those elements which are the same as in previous embodiments are designated by the same reference numerals only with a "*c*" affixed thereto. Ink jet housing 410 has a droplet outlet orifice 412 and fluid pressure passages 414 and 416 communicated with cylindrical transducer chambers $X_a$*c* and $Y_a$*c*, respectively. The passages 414 and 416 intersect each other at the orifice 412 which is the only communication between the passages. Fluid replenishing passages 417 and 418 communicate fluid from a reservoir (not shown) to a respective one of the transducer chambers $X_a$*c* and $Y_a$*c*. The voltage potential applied across the piezoelectric member for each transducer chamber $X_a$*c* and $Y_a$*c* is of such magnitude and duration that the fluid displacement and fluid velocity effected by a pressure pulse generated by each transducer chamber in a respective fluid pressure passage 414 or 416 is insufficient to express a droplet from the orifice 412. But the combined fluid displacement and fluid velocity, which is the result of the pressure pulse generated by transducer chamber $X_a$*c* and the pressure pulse generated by transducer chamber $Y_a$*c* being coincident at the orifice 412, will result in a droplet being expressed from the orifice 412.

Figure 14:
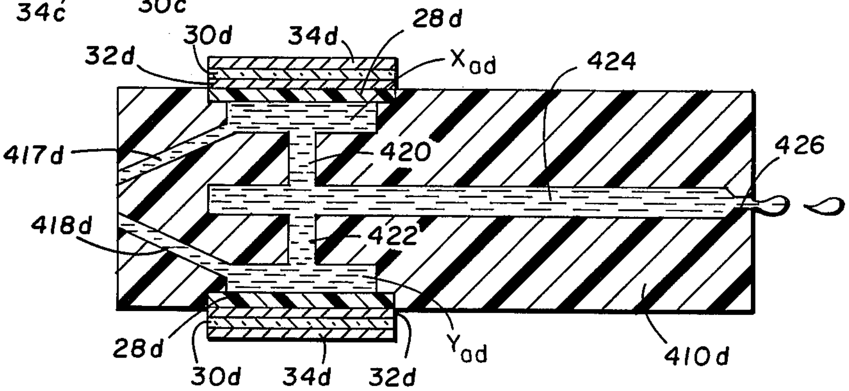
FIG. 14 is a cross section of a modification of an ink jet assembly of FIG. 13.

FIG. 14 discloses a modification of the embodiment of FIG. 13. Those elements which are the same as in previous embodiments are designated by the same reference numerals, only with a "*d*" affixed thereto. In this embodiment, a pair of fluid pressure passages 420 and 422 lead from a respective transducer chamber $X_a$*d* and $Y_a$*d* to an outlet passage 424 which, in turn, terminates at a droplet outlet orifice 426. The voltage potential applied across the piezoelectric member for each transducer chamber $X_a$*d* and $Y_a$*d* is of such magnitude and duration that the fluid displacement and fluid velocity effected by a pressure pulse generated in a respective fluid pressure passage 420 and 422 is insufficient by itself to express a droplet from the orifice 426. But the combined fluid displacement and fluid velocity, which is the result of the pressure pulse generated by transducer chamber $X_ad$ and the pressure pulse generated by transducer chamber $Y_ad$ being coincident at the orifice 426, will result in a droplet being expressed from the orifice 426.

An array of each of the coincidence jets disclosed in either FIG. 13 or 14 may be connected in a system in the same manner as the jets of the previous embodiments as disclosed, for instance, in FIGS. 4,6–8, 9 and 10. Also, a liquid supply passage and chamber may be provided adjacent the orifice 426, similar to liquid supply passage 16, rather than connecting the liquid supply passages 417*d*, 148*d*, directly to the transducer chambers as illustrated in FIG. 14.

Figure 15:
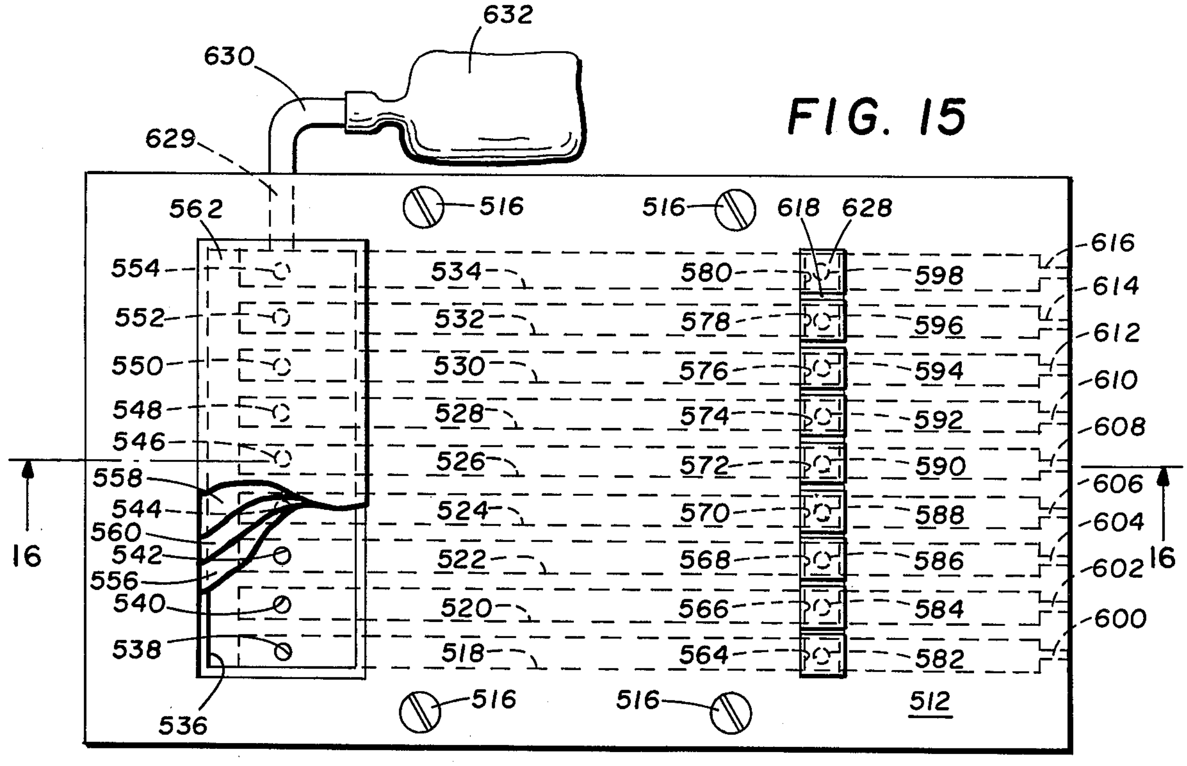
FIG. 15 is a partially cut away plan view of an ink jet array illustrating the principles of this invention in a different system than that employed by the embodiments of FIGS. 1-14.
Figure 16:
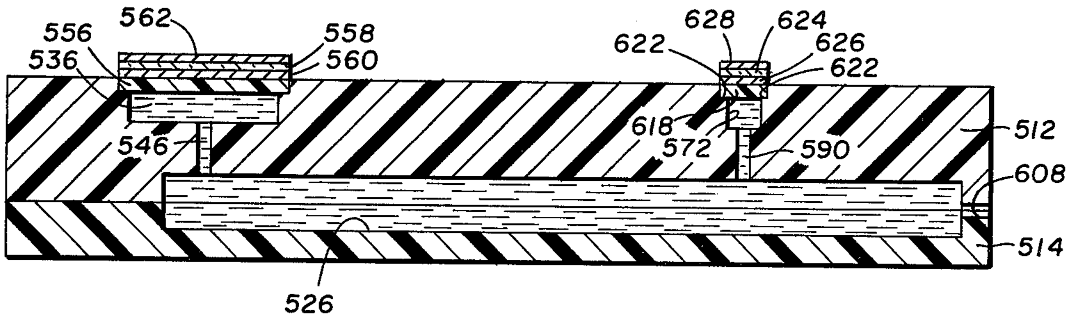
FIG. 16 is a view taken along section line 16—16 of FIG. 15.

The transducers in the matrix address system described above must be addressed on a time-shared basis, which is a limiting factor on transducer activation frequency and thus the printing speed of the ink jet array assembly. It has been found that the above coincidence ink jet principle may also be applied in a jet array which utilizes one addressable transducer for each jet. The utilization of this coincidence jet principle in such an array allows a smaller area of transducers to be utilized per jet when compared to the size of a transducer in such an array without the coincidence jet principle. With the transducers occupying a smaller space per jet, more transducers may be packed in a given space, which then permits the construction of a dense array with one addressable transducer for each jet. The principle to be described does not require time sharing of transducers resulting in increased activation frequency over the matrix address system. This principle is illustrated in FIGS. 15 and 16. A glass or plastic housing comprises two members 512, 514 secured together by screws 516 which effects a pressure seal between the members. The members 512 and 514, each have nine mating channels forming parallel fluid pressure passages 518, 520, 522, 524, 526, 528, 530, 532 and 534. Located in member 512 is a rectangular fluid pressure master transducer chamber 536 which extends across the nine channels and is communicated to pressure passages 518, 520, 522, 524, 526, 528, 530, 532 and 534 by passages 538, 540, 542, 544, 546, 548, 550, 552 and 554, respectively. The chamber 536 is sealed by a flexible layer 556 bonded to the member 512. A strip piezoelectric ceramic member 558 is sandwiched between and bonded to a pair of electrodes 560 and 562 with the electrode 560 being bonded to the layer 556 thereby effecitvely bonding the piezoelectric member 558 thereto. The strip piezoelectric member 558 is polarized during the manufacture thereof to contract in a plane parallel to the plane of the flexible layer 556 in the direction of its smallest dimension when excited by applying a voltage potential across the conductive members 560 and 562. Contraction of the piezoelectric member 558 will cause the flexible layer 556 to buckle inwardly thereby decreasing the volume in chamber 536 and effecting, simultaneously, pressure on the liquid in all of the nine pressure passages.

Also located in member 512 are nine other fluid pressure droplet expressing transducer chambers 564, 566, 568, 570, 572, 574, 576, 578 and 580 connected by respective passages 582, 584, 586, 588, 590, 592, 594, 596 and 598 to pressure passages 518, 520, 522, 524, 526, 528, 530, 532 and 534, respectively. At the front end of the pressure passages 518, 520, 522, 524, 526, 528, 530, 532 and 534 are droplet orifices 600, 602, 604, 606, 608, 610, 612, 614 and 616, respectively. A flexible seal 618 spans across the channels and is bonded to the top of the side walls separating the chambers as well as being bonded to a pair of shoulders 622 formed on top of the front and rear wall of each chamber. A strip piezoelectric ceramic member 624 is provided for each chamber and is sandwiched between and bonded to a pair of electrodes 626 nd 628 with the electrode 626 for each piezoelectric member being bonded to the flexible layer 618. The piezoelectric member 624 is also polarized during the manufacture thereof to contract in a plane parallel to the plane of the flexible layer 618 when excited by applying a voltage potential across the conductive members 626 and 628. contraction of a particular piezoelectric member will cause the corresponding portion of the flexible layer 618 to buckle inwardly thereby decreasing the volume in the corresponding chamber and effecting pressure on the liquid ink therein. A liquid supply passage 629 is communicated with the pressure chamber 536 and is also communicated through a conduit 630 to an ink supply reservoir 632, located remotely from the housing and which comprises a sealed flexible bag.

Figure 17:
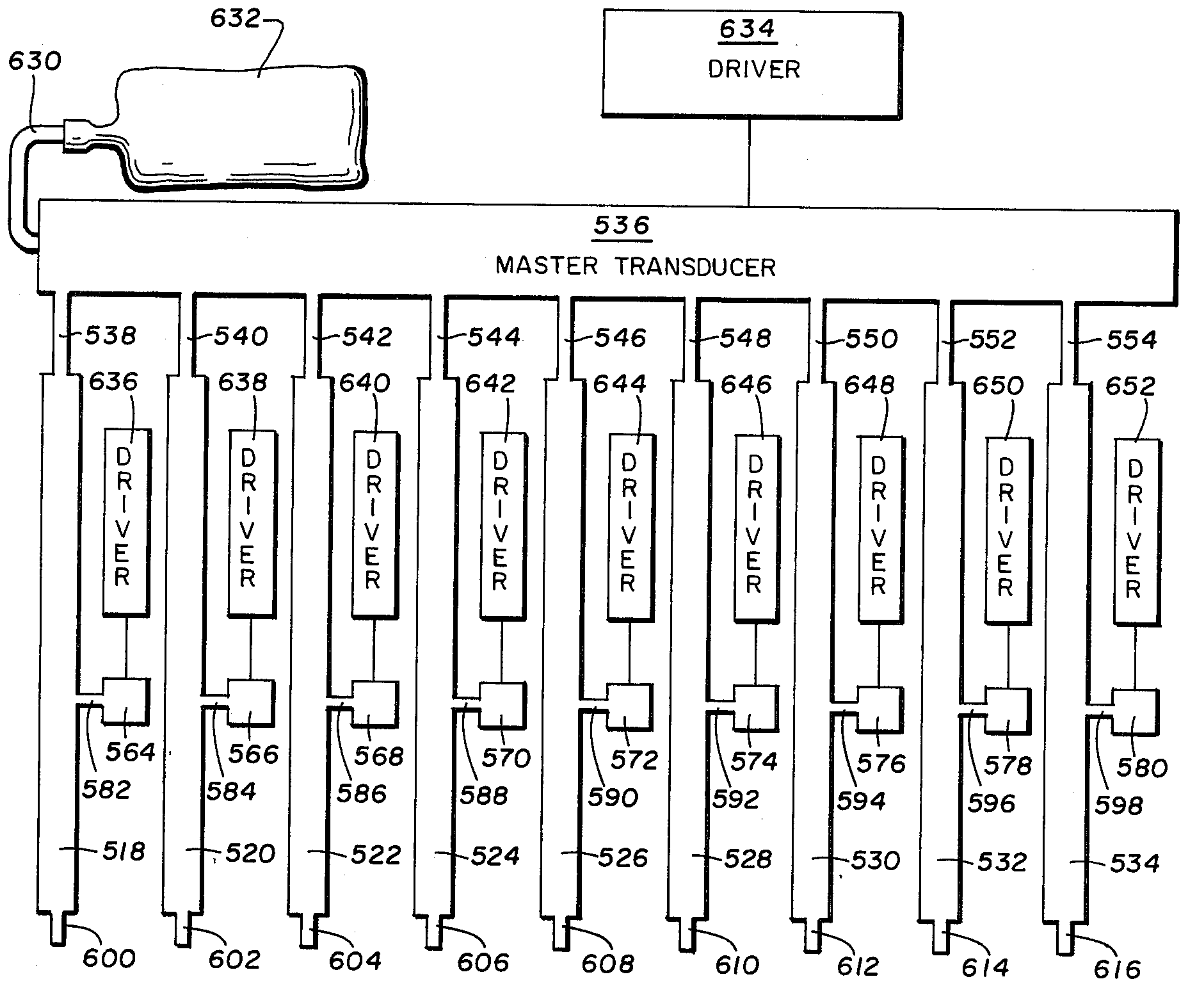
FIG. 17 is a schematic fluid circuit of the embodiment of FIG. 15.

Referring to a schematic fluid circuit of FIG. 17, an electronic driver 634 is connected to the piezoelectric member for master transducer chamber 536 and electronic drivers 636, 638, 640, 642, 644, 646, 648, 650 and 652 are connected to the piezoelectric members for transducer chambers 564, 566, 568, 570, 572, 574, 576, 578 and 580, respectively. The voltage potential applied acorss the piezoelectric member 558 for the master transducer is of such magnitude and duration that the fluid displacement and fluid velocity effected by a pressure pulse produced in the nine fluid pressure passages communicated therewith is just below the threshold which is necessary to express a droplet through any of the orifices. The voltage potential applied across the piezoelectric member 624 for each of the droplet expressing transducers is of such magnitude and duration that the fluid displacement and fluid velocity effected by a pressure pulse produced in its respective pressure passage is substantially below that produced by the master transducer but of a level that the combined fluid displacement and fluid velocity, which is the result of the pressure pulse generated by the master transducer and the pressure pulse generated by any one of the droplet expressing transducers when coincident at the orifice, will be above the threshold at a respective orifice to express a droplet therefrom.

In this system, the activation frequency is controlled by the frequency of the individual droplet expression transducers. Since the primary fluid displacement and velocity can be generated by the master transducer 536, the droplet expressing transducer can be much smaller than if it was required to generate the full fluid displacement and fluid velocity requirements for droplet expression. It has been found that the size of a transducer increases at a rate substantially less than linear with the increase in number of jets that it can operate. The combined area of the nine droplet expressing transducers and of the master transducer will be less than the combined area of nine separate transducer for operating nine separate jets in a prior art system not utilizing the coincidence jet principle. Obviously, as the number of jets increase this difference in area occupied by the transducers becomes very significant. The smaller the area the transducers occupy, the more dense the jet array that can be constructed. Thus, with this coincidence jet system, a dense jet array with a high droplet expression frequency is possible.

If desired, a liquid supply passage and chamber may be provided may also be employed in a multiple jet array of the system of FIG. 17. A master transducer chamber would be communicated to one inlet passage (for instance, 12, 12*a*, 12*b*) of each jet in a group of jets and a droplet expressing transducer would be communicated to the other inlet passage (for instance 14, 14*a*, 14*b*) of a respective jet in the same group of jets. The angle of intersection between the inlet passages would be altered so the droplet expressing transducer would only have to provide a minor portion of the fluid momentum vector required to express a droplet from the orifice 24 or through the outlet opening 207 or 305. The axis of the orifice 24 and of the outlet openings 207 and 305 would be coincident with the summation vector of the liquid momentum vectors in the two inlet passages.

Also, the coincidence jet illustrated in FIG. 13 may also be employed in a multiple array of the system of FIG. 17. A master transducer chamber would be communicated to one inlet passage, such as passage 414, of each jet in a group of jets and a droplet expressing transducer would be communicated to the other inlet passage, such as passage 416, of a respective jet in the same group of jets.

If desired, a liquid supply passage and chamber may be provided adjacent the orifices 600, 602, 604, 606, 608, 610, 612 614 and 616 similar to liquid supply passage 16 of FIG. 1, rather than connecting the liquid supply passage directly to the master transducer chamber 536 as illustrated in FIG. 15.

It should be understood that displacement devices other than piezoelectric crystals can be utilized in employing the above invention. For instance, such displacement devices may be electromagnetic or magnetostrictive.

What is claimed is:

1. In a multiple ink jet assembly comprising: at least two ink jets each having an outlet orifice, a first fluid chamber, first passage means communicating said first fluid chamber with the orifice of one of said jets, a second fluid chamber, second passage means communicating said second fluid chamber with each of the orifices of said jets, liquid in said first and second fluid chambers and each of said passage means, means for independently decreasing the volume of each of said first and second fluid chambers to generate pressure pulses therefrom, and means for effecting coincidently only at the orifice of said one jet the pressure pulse generated by said first chamber and the pressure pulse generated by said second chamber to express a liquid droplet therefrom.

2. The structure as recited in claim 1 wherein said last named means includes means for communicating said first and second passage means with each other at said one ink jet.

3. The structure as recited in claim 1 wherein each ink jet has first and second fluid inlet means communicating with each other; said first passage means being communicated with said first inlet means of said one ink jet, said second passage means being communicated with said second inlet means of each ink jet.

4. The structure as recited in claim 1 further comprising a third fluid chamber, third passage means communicating said third fluid chamber to the orifice of the other of said ink jets, means for decreasing the volume of said third chamber independently of said first and second fluid chambers to generate pressure pulses therefrom, and means for effecting coincidently only at the orifice of said other ink jet the pressure pulse generated by said third chamber and the pressure pulse generated by said second chamber to express a liquid droplet therefrom.

5. The structure as recited in claim 4 wherein each ink jet has first and second fluid inlet means communicating with each other; said first passage means being communicated with said first inlet means of said one ink jet; said second passage means being communicated with said second inlet means of each ink jet; said third passage means being communicated with said first inlet of said other ink jet.

6. The structure as recited in claim 5 further comprising a liquid supply source, said first and second inlet means of each jet are passage means intersecting each other, fluid supply passage means communicated with said source and intersecting the intersection of said first and second inlet passage means; said fluid supply passage means being contiguous said outlet orifice; said intersection, said supply passage means and said outlet orifice being entirely filled with liquid.

7. The structure as recited in claim 4 wherein the orifice of said one ink jet is the only orifice communicated with said first fluid chamber, and the orifice of said other ink jet is the only orifice communicated with said third fluid chamber.

8. The structure as recited in claim 7 wherein each ink jet has first and second fluid inlet means communicating with each other; said first passage means being communicated with said first inlet means of said one ink jet, said second passage means being communicated with said second inlet means of each ink jet, said third passage means being communicated with said first inlet of said other ink jet.

9. The structure as recited in claim 8 wherein said first and second inlet means of each jet are passage means intersecting each other at its particular orifice.

10. The structure as recited in claim 8 further comprising a liquid supply source, said first and second inlet means of each jet are passage means intersecting each other, fluid supply passage means communicated with said source and intersecting the intersection of said first and second inlet passage means; said fluid supply passage means being contiguous said outlet orifice; said intersections, said supply passage means and said outlet orifice being entirely filled with liquid.

11. The structure as recited in claim 8 wherein each ink jet comprises a pressure passage terminating with an orifice at one end thereof, said first and second inlet means being communicated to said pressure passage.

12. The structure as recited in claim 11, wherein said first and second inlet means are communicated to its respective said pressure passage means at locations which are hydraulically unequal distance from the respective orifice.

13. In a multiple ink jet assembly comprising: at least two groups of ink jets, each ink jet having an outlet orifice, a first fluid chamber, first passage means communicating said first fluid chamber with each of the orifices of the jets in one group of jets, a second fluid chamber, second passage means communicating said second fluid chamber with each of the orifices of the jets in the other group of jets, liquid in said first and second fluid chambers and each of said passage means, only the orifice of one of said jets being common to the orifices of both of said groups of jets, means for independently decreasing the volume of each of said first and second chambers to generate pressure pulses therefrom, and means for effecting coincidently only at the orifice of said one jet the pressure pulse generated by said first chamber and the pressure pulse generated by said second chamber to express a fluid droplet therefrom.

14. The structure as recited in claim 13 wherein said last named means includes means for communicating said first and second passage means with each other at said one ink jet.

15. The structure as recited in claim 13 wherein each ink jet has first and second fluid inlet means communicating with each other, said first passage means being communicated with said first inlet means of each ink jet of said one group of ink jets, said second passage means being communicated with said second inlet means for each ink jet of said other group of jets.

16. In a multiple ink jet assembly comprising: a plurality of groups of ink jets; each jet comprising an outlet orifice, first and second inlet means; a first group of fluid chambers; a second group of fluid chambers; each of said first group of chambers being communicated by fluid passage means with said first inlet means of a respective group of jets; each of said second group of chambers being communicated by fluid passage means with said second inlet means of a respective group of jets; said groups of jets and chambers being hydraulically arranged that each jet in each group communicated to said first group of chambers is common to another group of jets communicated to said second group of chambers with no two groups of jets including more than one common jet; liquid in said chambers and each of said passage means; means for independently decreasing the volume of each of said chambers for generating a pressure pulse to the liquid therein and in its respective passage means; and means for effecting coincidently at the orifice of a particular ink jet the pressure pulse generated by the chamber from said first group of chambers, which is connected to said first inlet means of said particular jet, and the pressure pulse generated by the chamber from said second group of chambers, which is connected to said second inlet means of said particular jet, to express a liquid droplet from the orifice of said particular ink jet.

17. The structure as recited in claim 16 further comprising a liquid supply source; said first and second inlet means are passage means intersecting each other, fluid supply passage means communicated with said source and intersecting the intersection of said first and second inlet passage means; said fluid supply passage means being contiguous said outlet orifice; said intersections, said supply passage means and said outlet orifice being entirely filled with liquid.

18. The structure as recited in claim 17 wherein the axis of said outlet orifice is coincident with the summation vector of the liquid momentum vectors in said first and second passage means.

19. The structure as recited in claim 17 wherein said first and second inlet passafge means are so arranged relative to said outlet orifice that liquid jets expressed therefrom, when only one of said chambers is pressurized, will entirely miss the boundaries of said outlet orifice.

20. In a multiple ink jet assembly comprising: a plurality of groups of ink jets; each jet comprising an outlet orifice, first and second inlet means; a first group of fluid chambers; a second group of fluid chambers; each of said first group of chambers being communicated by fluid passage means with said first inlet means of a respective group of jets; each of said second group of chambers being communicated by fluid passage means with said second inlet means of a respective group of jets; said groups being hydraulically arranged that each jet in each group communicated to said first group of chambers is common to another group of jets communicated to said second group of chambers with no two groups of jets including more than one common jet; liquid in said chambers and each of said passage means; said first chamber group including at least two subgroups of at least two chambers each; means for coincidentally decreasing the volume of the respective chambers in each said subgroup and independently decreasing the volume of each said subgroup of chambers for generating a pressure pulse to the liquid therein and in its respective passage means; means for independently decreasing the volume of each of the remainder of said chambers for generating a pressure pulse to the liquid therein and in its respective passage means; and means for effecting coincidently at the orifice of a particular ink jet the pressure pulse generated by the chamber from said first group of chambers, which is connected to said first inlet means of said particular jet, and the pressure pulse generated by the chamber from said second group of chambers, which is connected to said second inlet means of said particular jet, to express a liquid droplet from the orifice of said particular ink jet.

21. The structure as recited in claim 20 further comprising a liquid supply source; said first and second inlet means are passage means intersecting each other, fluid supply passage means communicated with said source and intersecting the intersection of said first and second inlet passage means; said fluid supply passage means being located contiguous said outlet orifice; said intersections, said supply passage means and said outlet orifice being entirely filled with liquid.

22. The structure as recited in claim 21 wherein the axis of said outlet orifice is coincident with the summation vector of the liquid momentum vectors in said first and second passage means.

23. The structure as recited in claim 21 wherein said first and second inlet passage means are so arranged relative to said outlet orifice that liquid jets expressed therefrom, when only one of said chambers is pressurized, will entirely miss the boundaries of said outlet orifice.

24. In a multiple ink jet assembly comprising: a plurality of groups of ink jets; each jet comprising an outlet orifice, first and second inlet means; a first group of fluid chambers; a second group of fluid chambers; each of said first group of chambers being communicated by fluid passage means with said first inlet means of a respective group of jets; each of said second group of chambers being communicated by fluid passage means with said second inlet means of a respective group of jets; said groups being hydraulically arranged that each jet in each group communicated to said first group of chambers is common to another group of jets communicated to said second group of chambers with no two groups of jets including more than one common jet; liquid in said chambers and each of said passage means; said first chamber group and said second chamber group each including at least two subgroups of at least two chambers each; means for coincidently decreasing the volume of the respective chambers in each said subgroup and independently decreasing the volume of each said subgroup of chambers for generating a pressure pulse to the liquid therein and in their respective passage means; means for independently decreasing the volume of each of the remainder of said chambers for generating a pressure pulse to the liquid therein and in its respective passage means; and means for effecting coincidently at the orifice of a particular ink jet the pressure pulse generated by the chamber from said first group of chambers, which is connected to said first inlet means of said particular jet, and the pressure pulse generated by the chamber from said second group of chambers, which is connected to said second inlet means of said particular jet, to express a liquid droplet from the orifice of said particular ink jet.

25. The structure as recited in claim 24 further comprising a liquid supply source; said first and second inlet means being passage means intersecting each other, fluid supply passage means communicated with said source and intersecting the intersection of said first and second inlet passage means; said fluid supply passage means being contiguous said outlet opening; said intersections, said supply passage means and said outlet orifice being entirely filled with liquid.

26. The structure as recited in claim 25 wherein said first and second inlet passage means are so arranged relative to said outlet orifice that liquid jets expressed therefrom, when only one of said chambers is pressurized, will entirely miss the boundaries of said outlet orifice.

27. The structure as recited in claim 25 wherein the axis of said outlet orifice is coincident with the summation vector of the liquid momentum vectors in said first and second passage means.

28. An ink jet assembly comprising: first and second fluid chambers; a first passage means leading from said first chamber; a second passage means leading from said second chamber; said first and second passage means intersecting each other; an orifice at said intersection; an outlet opening spaced from said orifice; said chambers and each of said passage means to said orifice being entirely filled with liquid, with the space between the orifice and outlet opening not being entirely filled with liquid; means for independently decreasing the volume of each of said chambers for generating a pressure pulse to the liquid therein and its respective passage means and thereby expressing liquid from said orifice; each of said passage means, said orifice and said outlet opening being so arranged relative to each other to express a liquid droplet through said outlet opening only when the pressure pulse generated by said first chamber and the pressure pulse generated by said second chamber are coincident at said orifice.

29. The structure as recited in claim 28 wherein the axis of said outlet opening is coincident with the summation vector of the liquid momentum vectors in said first and second passage means at said intersection.

30. The structure as recited in claim 29 further comprising a liquid supply source and fluid supply passage means communicated with said source and directly with each said chamber.

31. The structure as recited in claim 29 further comprising a liquid supply source and fluid supply passage means communicated with said source and each of said first and second passage means between said intersection and a respective said chamber.

32. In a multiple ink jet assembly comprising: at least two jets having an orifice; a first fluid chamber; a first passage means leading from said first chamber to the orifice of one of said jets; a second fluid chamber; a second passage means leading from said second chamber to the orifices of each of said jets; said first and second passage means intersecting each other at the orifice of said one jet; a first outlet opening spaced from said orifice of said one jet; a second outlet opening spaced from the orifice of the other of said jets; said chambers and each of said passage means to said orifices being entirely filled with liquid; means for independently decreasing the volume of each of said chambers for generating a pressure pulse to the liquid therein and its respective passage means and thereby expressing liquid from said orifice; each of said passage means, said orifice of said one jet and said first outlet opening being so arranged relative to each other to express a liquid droplet through said first outlet opening only when the pressure pulse generated by said first chamber and the pressure pulse generated by said second chamber are coincident at said orifice of said one jet.

33. The structure as recited in claim 32 further comprising a third fluid chamber; third passage means communicating said third chamber to the orifice of said other ink jet and intersecting said second passage means thereat; said third chamber and said third passage means to said orifice of said other jet being entirely filled with liquid; means for decreasing the volume of said third chamber independently of said first and second fluid chambers to generate a pressure pulse to the liquid therein and said third passage means and thereby expressing liquid from said orifice of said other jet; said third passage means, said orifice of said other jet and said second outlet opening being arranged relative to each other to express a liquid droplet through said second outlet opening only when the pressure pulse generated by said third chamber and the pressure pulse generated by said second chamber are coincident at said orifice of said other jet.

34. The structure as recited in claim 33 wherein the orifice of said one ink jet is the only orifice communicated with said first fluid chamber, and the orifice of said other ink jet is the only orifice communicated with said third fluid chamber.

35. The structure as recited in claim 33 wherein the axis of said outlet opening is coincident with the summation vector of the liquid momentum vectors in said first and second passage means at said intersection.

36. The structure as recited in claim 34 wherein the axis of said outlet opening is coincident with the summation vector of the liquid momentum vectors in said first and second passage means at said intersection.

37. In a multiple ink jet assembly comprising: at least two groups of ink jets; each ink jet having an orifice; a first fluid chamber; a first passage means communicating said first chamber with each of the orifices of the jets in one group of jets; a second fluid chamber; a second passage means communicating said second chamber with each of the orifices of the jets in the other group of jets; only one of said jets being common to both of said groups of jets, said first and second passage means intersecting each other at the orifice of said one jet; a first outlet opening spaced from said orifice of said one jet; a second outlet opening spaced from the orifice of the other of said jets; said chambers and each of said passage means to said orifices being entirely filled with liquid; means for independently decreasing the volume of each of said chambers for generating a pressure pulse to the liquid therein and its respective passage means and thereby expressing liquid from their respective orifices; each of said passage means, said orifice of said one jet and said first outlet opening being so arranged relative to each other to express a liquid droplet through said first outlet opening only when the pressure pulse generated by said first chamber and the pressure pulse generated by said second chamber are coincident at said orifice of said one jet.

38. The structure as recited in claim 37 wherein the axis of said outlet opening is coincident with the summation vector of the liquid momentum vectors in said first and second passage means at said intersection.

39. A method for expressing ink droplets from an ink jet assembly: decreasing the volume of one fluid chamber to generate a pressure pulse therein and in liquid leading therefrom to an orifice of the ink jet and thereby expressing liquid from the orifice without expressing a droplet through an outlet opening spaced from the orifice, decreasing the volume of a second fluid chamber to generate a pressure pulse therein and in liquid leading therefrom to the orifice thereby and expressing liquid from said orifice without expressing a droplet through the outlet opening, and expressing a liquid droplet through the outlet opening by effecting coincidently at the orifice the pressure pulse generated by said one chamber and the pressure pulse generated by said second chamber.

40. A method for expressing ink droplets from a jet of a multiple ink jet assembly: expressing a liquid droplet through an outlet opening spaced from an orifice of only one ink jet by decreasing the volume of one fluid chamber to generate a pressure pulse therein and in liquid leading therefrom to the orifice of said one ink jet, decreasing the volume of a second fluid chamber to generate a pressure pulse therein and in liquid leading therefrom to the orifice of said one ink jet and to at least the orifice of another ink jet, and effecting coincidently only at the orifice of said one ink jet the pressure pulse generated by said first chamber and the pressure pulse generated by said second chamber.

41. A method for expressing ink droplets for a jet of a multiple ink jet assembly: decreasing the volume of one fluid chamber to generate a pressure pulse therein and in liquid leading therefrom to an orifice of one ink jet and thereby expressing liquid from the orifice without expressing a droplet through an outlet opening spaced from the orifice, decreasing the volume of a second fluid chamber to generate a pressure pulse therein and in liquid leading therefrom to the orifice of said one ink jet and to at least the orifice of one other ink jet and thereby expressing liquid from said orifices without expressing a droplet through said outlet opening and an outlet opening spaced from the orifice of the other ink jet, and expressing a liquid droplet from the outlet opening spaced from the orifice of only said one ink jet by effecting coincidently at the orifice of said one ink jet the pressure pulse generated by said one chamber and the pressure pulse generated by said second chamber.

42. A method for expressing ink droplets from a jet of a multiple ink jet assembly: expressing a liquid froplet through an outlet opening spaced from an orifice of only one ink jet by decreasing the volume of one fluid chamber to generate a pressure pulse therein and in liquid leading therefrom to each of the orifices of one group of ink jets which includes said one ink jet, decreasing the volume of a second fluid chamber to generate a pressure pulse therein and in liquid leading therefrom to each of the orifices of another group of ink jets which includes only said one ink jet from said one group, and effecting coincidently only at the orifice of said one ink jet the pressure pulse generated by said first chamber and the pressure pulse generated by said second chamber.

43. A method for expressing ink droplets from a jet of a multiple ink jet assembly: decreasing the volume of one fluid chamber to generate a pressure pulse therein and in liquid leading therefrom to each of the orifices of one group of ink jets and thereby expressing liquid from said orifices without expressing a droplet through any outlet openings spaced from each orifice, decreasing the volume of a second fluid chamber to generate a pressure pulse therein and in liquid leading therefrom to each of the orifices of another group of ink jets and thereby expressing liquid from said last named orifices without expressing a droplet through any outlet openings spaced from each last named orifice, one of said orifices being common to said one group and said another group, and expressing a liquid droplet from only the opening spaced from said one orifice by effecting coincidently at said one orifice the pressure pulse generated by said one chamber and the pressure pulse generated by said second chamber.

44. A method for expressing ink droplets from a jet of a multiple ink jet assembly: expressing a liquid droplet from an orifice of only one ink jet by decreasing the volume of one fluid chamber to generate a pressure pulse therein and in liquid leading therefrom to the orifice of said one ink jet, decreasing the volume of a second fluid chamber to generate a pressure pulse therein and in liquid leading therefrom to the orifice of said one ink jet and to at least the orifice of another ink jet, and effecting coincidently only at the orifice of said one ink jet the pressure pulse generated by said first chamber and the pressure pulse generated by said second chamber.

45. A method for expressing ink droplets from a jet of a multiple ink jet assembly: expressing a liquid droplet from an orifice of only one ink jet by decreasing the volume of one fluid chamber to generate a pressure pulse therein and in liquid leading therefrom to each of the orifices of one group of ink jets which includes said one ink jet, decreasing the volume of a second fluid chamber to generate a pressure pulse therein and in liquid leading therefrom to each of the orifices of another group of ink jets which includes only said one ink jet from said one group, and effecting coincidently only at the orifice of said one ink jet the pressure pulse generated by said first chamber and the pressure pulse generated by said second chamber.

46. A method for expressing ink droplets from a jet of a multiple ink jet assembly: decreasing the volume of one fluid chamber to generate a pressure pulse therein and in liquid leading therefrom to an orifice of one ink jet without expressing a droplet from said orifice, decreasing the volume of a second fluid chamber to generate a pressure pulse therein and in liquid leading therefrom to the orifice of said one ink jet and to at least the orifice of one other ink jet without expressing a droplet from any of said orifices, and expressing a liquid droplet from the orifice of only said one ink jet by effecting coincidently at the orifice of said one ink jet the pressure pulse generated by said one chamber and the pressure pulse generated by said second chamber.

47. A method for expressing ink droplets from a jet of a multiple ink jet assembly: decreasing the volume of one fluid chamber to generate a pressure pulse therein and in liquid leading therefrom to each of the orifices of one group of ink jets without expressing a liquid droplet from said orifices, decreasing the volume of a second fluid chamber to generate a pressure pulse therein and in liquid leading therefrom to each of the orifices of another group of ink jets without expressing a liquid droplet from said last named orifices, one of said orifices being common to said one group and said another group, and expressing a liquid droplet from only said one orifice by effecting coincidently at said one orifice the pressure pulse generated by said one chamber and the pressure pulse generated by said second chamber.

* * * * *